Figure 1:
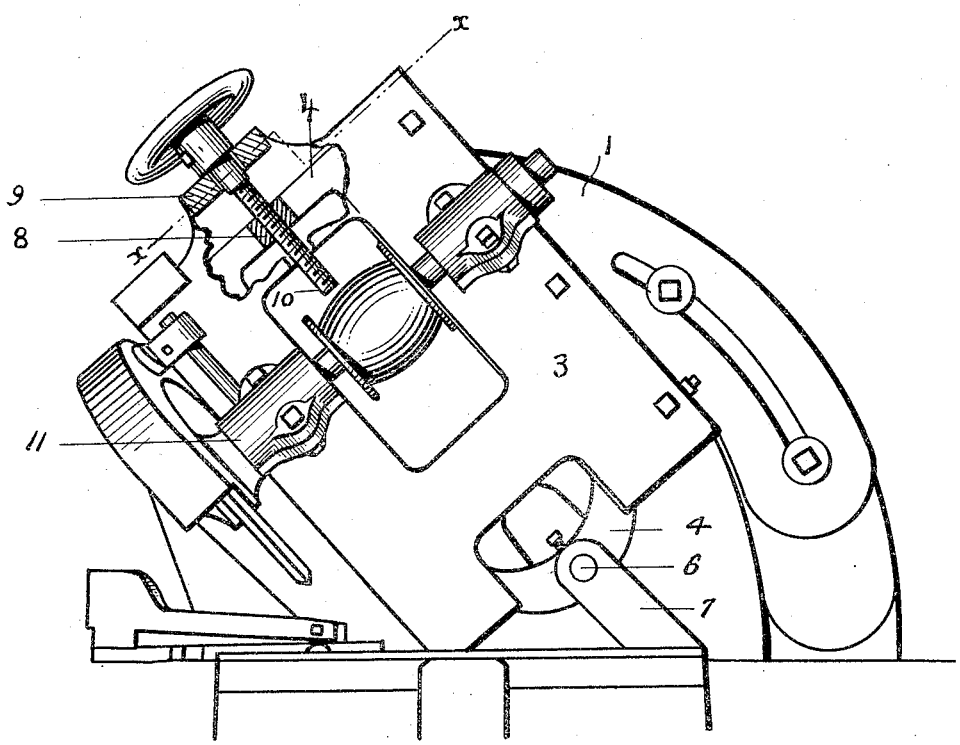

J. P. HEDSTROM.
ADJUSTABLE HEAD FOR BANDSAW GRINDERS.
APPLICATION FILED JUNE 15, 1912.

1,102,504.

Patented July 7, 1914.
4 SHEETS—SHEET 1.

WITNESSES:
Geo. W. Smith
Christine A. Braidel.

INVENTOR
John P. Hedstrom
BY
Geo. B. Willcox ATTORNEY

J. P. HEDSTROM.
ADJUSTABLE HEAD FOR BANDSAW GRINDERS.
APPLICATION FILED JUNE 15, 1912.

1,102,504.

Patented July 7, 1914.
4 SHEETS—SHEET 2.

WITNESSES:
Geo. W. Smith
Christine A. Braidel.

John P. Hedstrom INVENTOR

BY

Geo. B. Willcox ATTORNEY

THE NORRIS PETERS CO., PHOTO-LITHO., WASHINGTON, D. C.

J. P. HEDSTROM.
ADJUSTABLE HEAD FOR BANDSAW GRINDERS.
APPLICATION FILED JUNE 15, 1912.

1,102,504.

Patented July 7, 1914.
4 SHEETS—SHEET 3.

WITNESSES:
Geo. W. Smith
Christine A. Braidel.

John P. Hedstrom INVENTOR

BY

Geo. B. Willcox ATTORNEY

J. P. HEDSTROM.
ADJUSTABLE HEAD FOR BANDSAW GRINDERS.
APPLICATION FILED JUNE 15, 1912.

1,102,504.

Patented July 7, 1914.

4 SHEETS—SHEET 4.

WITNESSES:
Leo W. Smith
Christine A. Braidel.

John P. Hedstrom  INVENTOR

BY

Geo. B. Willcox. ATTORNEY

UNITED STATES PATENT OFFICE.

JOHN P. HEDSTROM, OF BIG RAPIDS, MICHIGAN.

ADJUSTABLE HEAD FOR BAND-SAW GRINDERS.

1,102,504. Specification of Letters Patent. Patented July 7, 1914.

Application filed June 15, 1912. Serial No. 703,990.

*To all whom it may concern:*

Be it known that I, JOHN P. HEDSTROM, a citizen of the United States, residing at Big Rapids, in the county of Mecosta and State of Michigan, have invented certain new and useful Improvements in Adjustable Heads for Band-Saw Grinders; and I do hereby declare the following to be a full, clear, and exact description of the invention, such as will enable others skilled in the art to which it appertains to make and use the same.

This invention is an improvement in band saw grinders and the improvement pertains more particularly to an improvement in the adjustable head of a band saw grinder.

As is well known, it has been the common practice to build band saw grinders with heads on which the grinding wheel is mounted, the head being of such construction that the grinding wheel can be moved up and down to bring it out of or into contact with the work.

It has been common heretofore to make such heads adjustable in two directions, that is, first so that the wheel may be tilted through various angles so as to enter the work more or less diagonally in order to produce the desired shape of tooth on the saw. This has generally been accomplished by mounting the grinding wheel in bearings that are carried by a sliding frame, the frame in turn being mounted on a head plate provided with guides in which the frame slides up and down, the head plate itself being tiltable through various angles in order to provide the desired angular adjustment of the grinding wheel. The sliding frame has usually been connected by means of a connecting rod to some part of the driving mechanism, so that the frame is slid up and down to bring the emery wheel out of or into action.

It has heretofore been customary in grinding machines constructed in the manner above described, to mount the sliding frame so that it moves up and down between guides on the head plate, the guides being located outside of the sliding frame. It is necessary for the grinding wheel to be located at one side of the head plate, and since the bearings must necessarily be mounted on the sliding frame, it has heretofore been necessary to allow the wheel to overhang the bearings by a distance at least equal to the width of the guide on the head plate, and this overhang of the wheel has frequently resulted in allowing the wheel to vibrate, thereby seriously affecting the quality and speed of the work. It has also been found in practice that in the construction above outlined, the sliding joint between the guide of the head plate and the sliding frame is exposed to the action of emery dust, resulting in wear and loosening of the frame, which also contributes to the undesirable vibration of the emery wheel.

It is essential that the sliding gate of a band saw grinder shall be capable of longitudinal adjustment as well as longitudinal sliding movement along its guides. The connecting rod by which the sliding frame is moved has a constant travel, making the length of stroke of the frame always the same, but since it frequently happens that the depth of tooth must be made different on different saws, and especially because the diameter of the wheel changes as it becomes worn, longitudinal adjustment of the frame on which the wheel is mounted is required.

It has heretofore been customary to provide for such longitudinal adjustment by extending the top of the connecting rod up beyond the top of the head and threading the connecting rod into a boss on the sliding frame, so that while the connecting rod always has the same travel, the frame may be raised or lowered on the connecting rod by means of the screw adjustment. Since in machines of this type the pulley on the grinding wheel arbor is located in the center of the head and since the driving belt must travel through a central opening in the head and through a similar opening in the sliding gate, it follows that in the construction just described it is necessary to locate the connecting rod at one side of the frame, as otherwise it would interfere with the belt.

It has developed in practice that there are certain serious disadvantages attending the locating of the connecting rod at one side of the head in the manner just described. One disadvantage of this construction is that the connecting rod must be very long and of comparatively small diameter, resulting in the liability of springing and vibrating in the rod. Another disadvantage is that the thrust of the connecting rod, being applied at one side of the sliding frame, results in the tendency to tilt and bind the sliding frame in its guides, producing excessive wear on the diagonally opposite outer and lower corners of the sliding frame, and to induce vibration of the grinding wheel.

It is the purpose of my present invention to obviate all of the difficulties above mentioned and to produce a simple, strong, and durable head for band saw grinders in which the emery wheel can be mounted close to its bearings, the sliding surfaces of the head are protected from flying emery dust, and the sliding gate that carries the grinding wheel is operated by a connecting rod so applied that the thrust on the gate will be central and in a direction parallel with the guides of the gate.

A further object is to provide adjusting means for the sliding gate by which the wheel may be raised and lowered to compensate for wear of the wheel or for various depths of teeth, the adjusting device being independent of the connecting rod and located central with relation to the sliding gate.

With these and certain other objects in view which will appear later in the specification, my invention consists in the devices described and claimed, and in the equivalents thereof.

Figure 2:
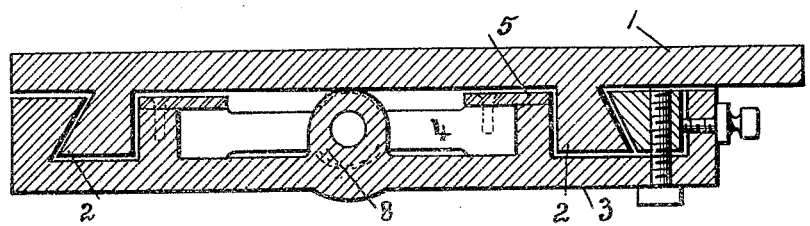
Figure 3:
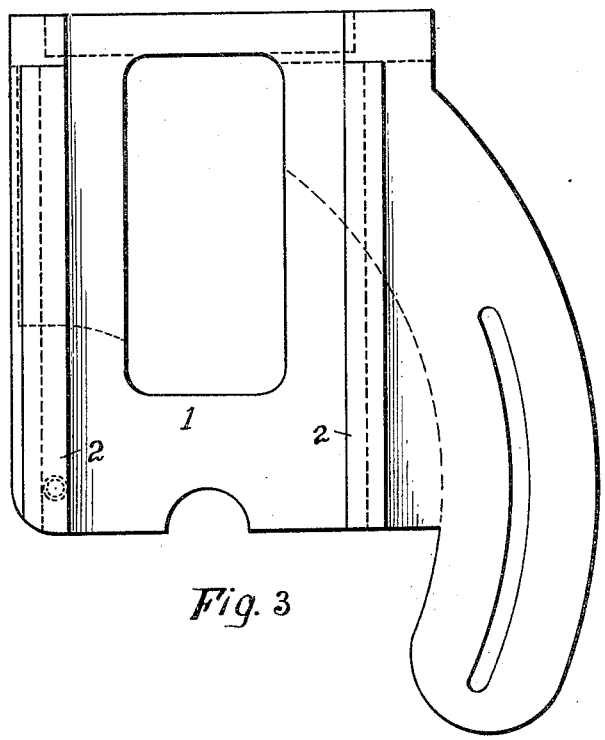
Figure 4:
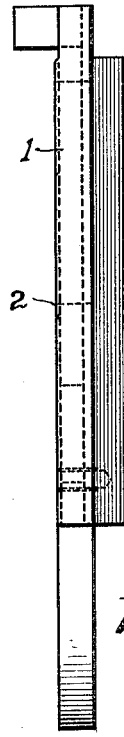
Figure 5:
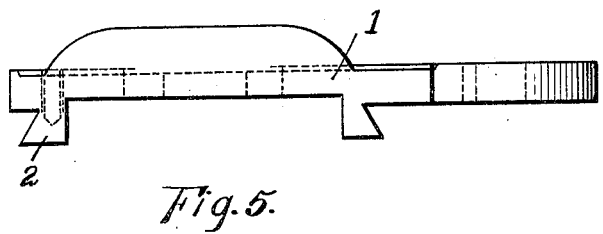
Figure 6:
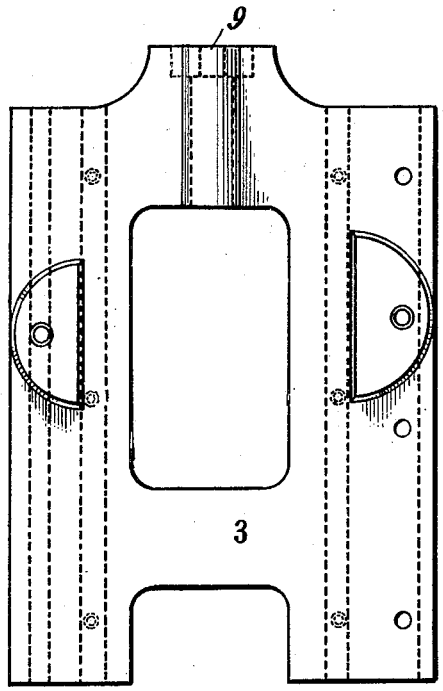
Figure 7:
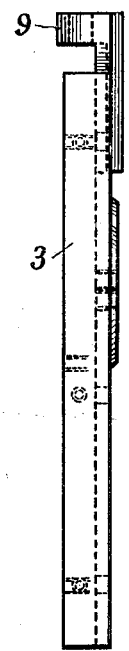
Figure 8:
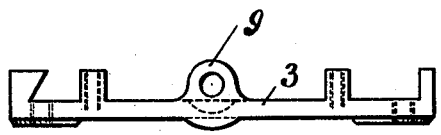
Figure 9:
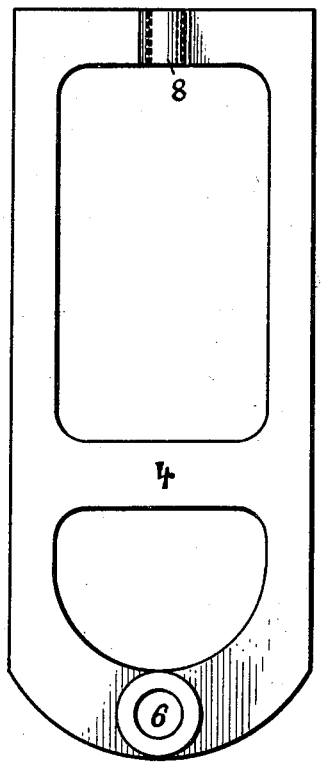
Figure 10:
Figure 11:
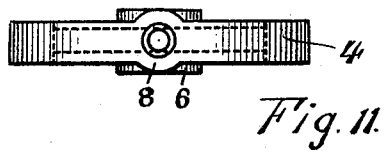

In the drawings, Figure 1 is a front view broken away in part, of an adjustable head for band saw grinders with my improvement attached; Fig. 2 is an enlarged transverse section taken on the line x—x of Fig. 1; Fig. 3 is a front view of the head plate; Figs. 4 and 5 are respectively side and top views of the head plate; Fig. 6 is a front view of the sliding gate; Figs. 7 and 8 are respectively side and top views of the same; Fig. 9 is a front view of the adjusting gate; and Figs. 10 and 11 are respectively side and top views of the same.

My improved adjustable head employs three principal members, as distinguished from the two members heretofore employed in the construction previously described, in which a head plate and a single sliding frame mounted on the head plate were employed.

My improvement employs a head plate, and a sliding gate mounted thereon, but also employs an adjusting gate interposed between the head plate and the sliding gate, and upon which the sliding gate is adjustably mounted. The construction of this adjusting gate and its connections and the functions performed by it will now be described.

The head plate 1 is provided with vertical guides 2 upon which is mounted the sliding gate 3 that carries the bearings of the emery wheel arbor. I interpose between the sliding gate and the head plate 1 an adjusting gate 4. This adjusting gate is preferably inclosed within the sliding gate 3, being retained by guide plates 5 so that the sliding gate may have a limited up-and-down movement of adjustment with relation to the adjusting gate 4, but normally moves up and down with the adjusting gate. The lower end of adjusting gate 4 is provided with a connection 6 to which the upper end of the connecting rod 7 is pivoted. The upper end of adjusting gate 4 is provided with a threaded lug 8, registering with a bored lug 9 on the upper end of the sliding gate 3, and an adjusting screw 10 is swiveled through the lug 9, the lower part of the screw being threaded into the lug 8 so that by turning screw 10 the sliding gate 3 may be raised or lowered with reference to the adjusting gate 4.

It will be observed that sliding gate 3 overlaps and incloses the vertical guides 2 and the guide plates 5, so that all of these sliding surfaces are protected from flying emery dust, thereby reducing wear on these parts and assisting in eliminating vibration of the wheel.

It will be further observed that the bearing 11 in which the grinding wheel spindle is mounted is located at the outer edge of sliding gate 3 and that the wheel is therefore supported close to the bearing, avoiding the disadvantage of former constructions in which the wheel was necessarily overhung a considerable distance from the bearing.

A still further and very important object of my improved construction is that the connecting rod and the adjusting screw 10 are both located centrally with reference to the sliding gate, so that all tendency to produce uneven wear on the guides is eliminated.

By the means above described I have produced an adjustable head for band saw grinders that provides great strength and durability, reduces wear and consequent chattering to a minimum, and insures even and steady running of the grinding wheel, which is so essential in the rapid production of accurate work.

Having described my invention, what I claim and desire to secure by Letters Patent, is:—

1. In an adjustable head for band saw grinders, the combination with a head plate, and a sliding gate mounted thereon, of an adjusting gate interposed between said head plate and said sliding gate, a reciprocating connecting rod having pivotal connection with the lower end of said adjusting gate, and an adjusting screw connecting the upper end of said adjusting gate with the upper end of said sliding gate, for the purpose set forth.

2. In an adjusting head for band saw grinders, the combination with a head plate and a sliding gate mounted thereon, of guides on the rear face of said sliding gate, an adjusting gate carried by said guides and interposed between said head plate and said sliding gate, a reciprocating connecting rod pivotally connected to the central part of the lower end of said adjusting guide, and an adjusting screw loosely received in the upper end of said sliding gate, the lower part of said sliding gate having threaded engagement with the upper end of said adjusting gate.

3. In an adjustable head for band saw grinders, the combination with the head plate, and a sliding gate provided with journal bearings mounted thereon, of an adjusting gate interposed between said head plate and said sliding gate, guides on the front face of said head plate to receive said sliding gate, and guides on the rear face of said sliding gate to receive said adjusting gate, the outer edges of said sliding gate overlapping and inclosing said guides.

4. In an adjustable head for band saw grinders, the combination with a head plate having vertical guides, a sliding gate mounted on said head plate overlapping and inclosing said vertical guides and provided with a pair of emery shaft bearings, of an adjusting gate interposed between the head plate and the sliding gate, said gate being inclosed within the sliding gate, retaining plates to permit the sliding gate of limited up-and-down movement of adjustment with relation to the adjusting gate, and a connecting rod pivotally connected to the lower end of said adjusting gate.

In testimony whereof, I affix my signature in presence of two witnesses.

JOHN P. HEDSTROM.

Witnesses:
 CHRISTINE A. BRAIDEL,
 GEO. W. SMITH.

Copies of this patent may be obtained for five cents each, by addressing the "Commissioner of Patents, Washington, D. C."